(12) United States Patent
Tisne

(10) Patent No.: US 10,396,450 B2
(45) Date of Patent: Aug. 27, 2019

(54) ELECTRONIC APPARATUS WITH LIMITED SPURIOUS RADIO EMISSIONS

(71) Applicant: SAGEMCOM BROADBAND SAS, Rueil Malmaison (FR)

(72) Inventor: Alain Tisne, Rueil Malmaison (FR)

(73) Assignee: Sagemcom Broadband SAS, Rueil Malmaison (FR)

( * ) Notice: Subject to any disclaimer, the term of this patent is extended or adjusted under 35 U.S.C. 154(b) by 0 days.

(21) Appl. No.: 15/777,045

(22) PCT Filed: Nov. 17, 2016

(86) PCT No.: PCT/EP2016/078083
§ 371 (c)(1),
(2) Date: May 17, 2018

(87) PCT Pub. No.: WO2017/085232
PCT Pub. Date: May 26, 2017

(65) Prior Publication Data
US 2018/0342799 A1   Nov. 29, 2018

(30) Foreign Application Priority Data

Nov. 19, 2015 (FR) ..................... 15 61162

(51) Int. Cl.
*H01Q 1/24* (2006.01)
*H01Q 1/52* (2006.01)
*H04B 15/06* (2006.01)

(52) U.S. Cl.
CPC ............... *H01Q 1/52* (2013.01); *H01Q 1/243* (2013.01); *H01Q 1/526* (2013.01); *H04B 15/06* (2013.01)

(58) Field of Classification Search
None
See application file for complete search history.

(56) References Cited

U.S. PATENT DOCUMENTS

| 6,899,564 | B2 * | 5/2005 | Lee ........................ H01R 43/18 |
|---|---|---|---|
| | | | 439/354 |
| 7,997,937 | B2 * | 8/2011 | Kondo ............... H01R 13/6477 |
| | | | 439/607.4 |
| 8,845,363 | B2 * | 9/2014 | Ardisana, II ...... B29C 45/14065 |
| | | | 439/606 |
| 9,263,836 | B2 * | 2/2016 | Zhao ..................... H01R 24/60 |
| 2010/0231459 | A1 | 9/2010 | Kawata et al. |
| 2014/0073182 | A1 | 3/2014 | Ardisana, II et al. |
| 2015/0207273 | A1 | 7/2015 | Zhao et al. |

FOREIGN PATENT DOCUMENTS

EP   2 472 676 A1   7/2012

* cited by examiner

*Primary Examiner* — Trinh V Dinh
(74) *Attorney, Agent, or Firm* — Muncy, Geissler, Olds & Lowe, P.C.

(57) ABSTRACT

The invention relates to an electronic apparatus including at least one electronic board provided with an external coupling connector and a radio transmission device comprising at least one antenna tuned to a predetermined frequency, the connector having a metal casing connected to an earth of the electronic apparatus. At least one metal tab is attached to the metal casing of the connector in order to project laterally from the casing so as to attenuate, in the vicinity of the antenna, a spurious electromagnetic field produced by the connector during operation, the tab having a length suitable for resonating at the predetermined frequency.

4 Claims, 1 Drawing Sheet

ELECTRONIC APPARATUS WITH LIMITED SPURIOUS RADIO EMISSIONS

The present invention relates to protecting electronic apparatus against interfering radio signals.

STATE OF THE ART

Electronic apparatus is known that comprises at least one electronic card provided with a connector for external connection and with a radio transceiver device including at least one antenna.

In such apparatuses, there are found radio transceiver devices such as mobile telecommunications devices of the 2G, 3G, or 4G type, or local communication devices of the WIFI or BLUETOOTH type. The antenna of a 2G, 3G, 4G transceiver device is tuned to GSM frequency bands. The antenna of a WIFI or BLUETOOTH transceiver device is tuned to the 2.4 gigahertz (GHz) frequency band that is part of the ISM frequency bands.

For more recent electronic apparatuses, and by way of example, the connector for external connection is a high-speed connector of the USB 3.0, SATA 3, or HDMI 3.0 standards. In operation, such connectors for external connection produce an electromagnetic field encompassing the frequency band used by the radio transceiver device, such that electromagnetic interference is created between the connector for external connection and the radio transceiver device.

It is thus necessary to arrange the connector for external connection and the antenna in positions that are remote from each other so that the magnetic field produced by the connector for external connection does not impair the performance of the radio transceiver device (drop in data rate or loss of data, or even breaking of the radio connection if the interfering electromagnetic field is of higher power than the communication signals).

At the same time, the current trend in terms of design is to reduce the dimensions of such electronic apparatus in order to make it as discreet as possible, which tends to cause the connector for external connection to be placed closer to the antenna of the radio transceiver device.

In order to limit electromagnetic interference between the connector and the antenna, it is further known to surround the connector with shielding in the form of a metal casing, and also to shield the elements connected to the connector (cable or data medium). However, there are always impedance discontinuities between the various shielding elements, which form radiating areas and sources of electromagnetic interference.

OBJECT OF THE INVENTION

An object of the invention is to provide electronic apparatus that is very compact, having relatively good performance for radio signal transmission.

SUMMARY OF THE INVENTION

To this end, the invention provides electronic apparatus including at least one electronic card provided with a connector for external connection and a radio transceiver device including at least one antenna tuned to a predetermined frequency, the connector having a metal casing connected to an electrical ground of the electronic apparatus. At least one metal tab is electrically connected to the metal casing and is fastened thereto in order to protrude sideways from the casing in order to attenuate, in the vicinity of the antenna, at least part of an interfering electromagnetic field produced by the connector in operation, the tab being arranged so as to resonate at least at the predetermined frequency.

Thus, the tab deflects the electromagnetic field so as to leave an area in the electronic apparatus in which the interfering electromagnetic field is attenuated. The antenna is positioned in this area in such a manner that the performance of the radio transceiver device is not affected by the interfering electromagnetic field. Furthermore, during design, it is easy to position the tab in such a manner as to position the area of attenuation in the most suitable place in the electronic apparatus.

Other characteristics and advantages of the invention appear on reading the following description of particular, non-limiting embodiments of the invention.

BRIEF DESCRIPTION OF THE FIGURES

Reference is made to the accompanying drawings, in which.

DETAILED DESCRIPTION OF THE INVENTION

Figure 1:
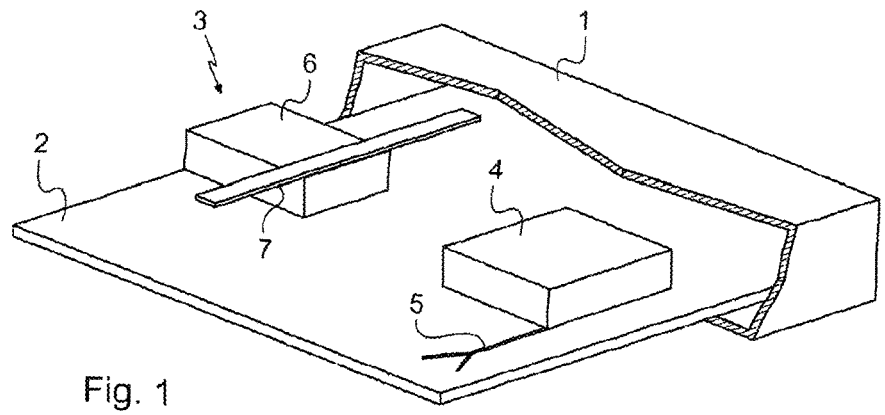
FIG. 1 is a cutaway diagrammatic perspective view of electronic apparatus of the invention.

With reference to the figures, the electronic apparatus of the invention comprises a housing 1 enclosing an electronic card 2 provided with a connector 3 for external connection and with a radio transceiver device 4 including at least one antenna, represented by reference 5, tuned to a predetermined frequency. The antenna 5 is positioned at a side of the housing 1 opposite from the connector 3.

In this embodiment, the connector 3 is of the USB 3.0 standard in order to enable the connector 3 to be connected to a data medium of the USB flash drive type or else to a cable of the same standard. The connector 3 has a structure that is known with pins that are electrically connected to conductor tracks of the electronic card 2. The connector 3 further includes shielding formed by a metal casing 6 that is electrically connected to an electrical ground of the electronic card and that surrounds the pins of the connector 3 and their connections to the conductor tracks.

In this embodiment, the radio transceiver device 4 arranged to operate in compliance with WIFI standard and the antenna 5 is tuned to the 2.4 GHz frequency band.

In the invention, a metal tab 7 is fastened to the metal casing 6 of the connector 3 and is electrically connected thereto. More precisely, the central portion of the metal tab is 7 soldered to the top of the metal casing 6 perpendicularly to a main direction of the connector 3 (direction for engaging a connector complementary to the connector 3). The metal tab 7 has end portions that protrude sideways on each side of the metal casing 3.

The metal tab 7 has a length such that the end portions are of lengths that are tuned to the wavelength corresponding to the resonant frequency of the antenna 5. Thus, the metal tab 7 acts as a direction dipole of a Yagi type antenna so as to attenuate, in the vicinity of the antenna 5, an interfering electromagnetic field produced by the connector 3 while it is in operation.

In FIG. 1, it can be seen that the metal tab 7 is rectilinear in shape.

Figure 2:
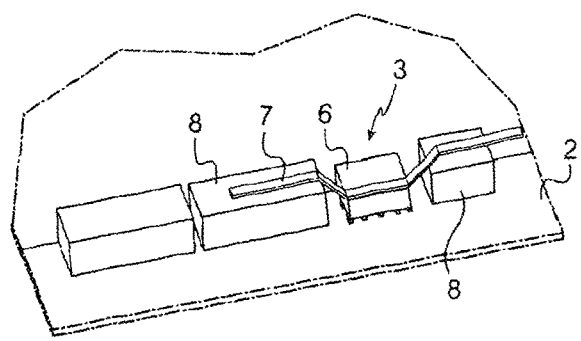
FIG. 2 is a diagrammatic and fragmentary perspective view of a first variant of the apparatus.

In the variant in FIG. 2, the end portions of the metal tab 7 have bends so as to extend in part around components 8 that are fastened to the electronic card 2 in the vicinity of the connector 3.

Figure 3:
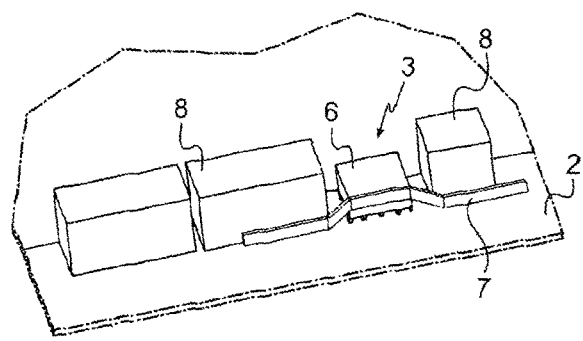
FIG. 3 is a diagrammatic and fragmentary perspective view of a second variant of the apparatus.

In the variant in FIG. 3, which is similar in structure to FIG. 2, the central portion of the metal tab 7 is not fastened to the top of the casing 6 but to its rear wall.

Naturally, the invention is not limited to the embodiments described but encompasses any variant coming within the ambit of the invention as defined by the claims.

In particular, the electronic apparatus 2 may have a structure that is different from that described.

The electronic apparatus may comprise a plurality of electronic cards connected to one another. The radio transceiver device 4 and the connector 3 may belong to different electronic cards.

The electronic apparatus may include one or more connectors for external connection, of the same type or of different types. At least one of these connectors is fitted with a metal tab 7.

The electronic apparatus may include a plurality of antennas tuned to predetermined frequencies and a plurality of metal tabs each having a length that is suitable for resonating at one of the predetermined frequencies. Alternatively, the electronic apparatus may include an electronic tab that is shaped to resonate at a plurality of frequencies.

Other standards may be used.

The metal tab 7 may be clip-fastened, screw-fastened, stapled, or fastened by any other means to the metal casing 6.

The metal tab 7 may be fastened to any portion of the metal casing 6, e.g. on the rear face of the metal casing 6. The width of the metal tab 7 may extend parallel to the electronic card 2, or perpendicularly to the electronic card 2.

The invention claimed is:

1. An electronic apparatus including at least one electronic card provided with at least one connector for external connection and at least one radio transceiver device including at least one antenna tuned to a predetermined frequency, the connector having a metal casing connected to an electrical ground of the electronic apparatus, the apparatus being characterized in that at least one metal tab is fastened to the metal casing of the connector in order to protrude sideways from the casing in order to attenuate, in the vicinity of the antenna, an interfering electromagnetic field produced by the connector in operation, the tab having a length that is suitable for resonating at the predetermined frequency.

2. The apparatus according to claim 1, wherein the tab is rectilinear in shape.

3. The apparatus according to claim 1, wherein the tab is shaped to extend beyond at least a portion of a component of the electronic apparatus.

4. The apparatus according to claim 1, comprising a plurality of antennas tuned to predetermined frequencies and a plurality of metal tabs, each having a length that is suitable for resonating at one of the predetermined frequencies.

* * * * *